(12) United States Patent
Graf et al.

(10) Patent No.: US 7,310,322 B2
(45) Date of Patent: Dec. 18, 2007

(54) METHOD AND NODE FOR THE CONTROL OF A CONNECTION IN A COMMUNICATION NETWORK

(75) Inventors: Leslie Graf, Melbourne (AU); Phil Hodges, Aachen (DE); Mark Hollis, Park Orchards (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 992 days.

(21) Appl. No.: 10/398,106

(22) PCT Filed: Sep. 19, 2001

(86) PCT No.: PCT/EP01/10812

§ 371 (c)(1),
(2), (4) Date: Apr. 1, 2003

(87) PCT Pub. No.: WO02/32152

PCT Pub. Date: Apr. 18, 2002

(65) Prior Publication Data

US 2003/0195981 A1    Oct. 16, 2003

(30) Foreign Application Priority Data

Oct. 13, 2000    (EP)    ............................ 00122416

(51) Int. Cl.
*H04Q 7/00*    (2006.01)
*H04L 12/66*    (2006.01)
*H04J 3/16*    (2006.01)

(52) U.S. Cl. ................. 370/328; 370/352; 370/465

(58) Field of Classification Search ............ 370/310.1, 370/331–332, 338, 349, 328, 352–353, 465–466, 370/400–401, 395.3, 395.21, 467, 493–495, 370/395.1, 396, 354; 455/517; 704/258, 704/260, 270
See application file for complete search history.

(56) References Cited

U.S. PATENT DOCUMENTS 5,903,862 A    5/1999    Weaver, Jr. et al. ........ 704/212
6,108,560 A    8/2000    Navaro et al. .............. 455/517
6,501,736 B1*    12/2002    Smolik et al. .............. 370/252
6,879,599 B1*    4/2005    Galyas et al. ............... 370/466

FOREIGN PATENT DOCUMENTS

WO    WO 93/00778    1/1993
WO    WO 00/51330    8/2000

OTHER PUBLICATIONS

"Technical Specification Group Core Network; Out of Band Transcoder Control—Stage 2", 3rd Generation Partnership Project (3GPP), Online!, Nov. 15-19, 1999, Phoenix, AZ, US.

* cited by examiner

*Primary Examiner*—Firmin Backer
*Assistant Examiner*—Farah Faroul
(74) *Attorney, Agent, or Firm*—Roger S. Burleigh (57) ABSTRACT

In a method for the control of a connection in a communication network comprising a plurality of nodes (MSC, TSN, MG), a connection (CO) is established stepwise between nodes (MSC, TSN, MG). At least two of the nodes (MSC, TSN, MG) are adapted to insert an entity into the connection (CO), the entity affecting the connection quality, or to remove an entity affecting the connection quality from the connection. An indicator is forwarded between nodes controlling the connection (CO) wherein the indicator indicates whether the connection (CO) comprises an entity affecting the connection quality. A node which decides to insert an entity into the connection or remove an entity adjusts the indicator accordingly before forwarding it to a further node (MSC, TNS, MSC') controlling the connection (CO). A node (MSC, TSN, MSC') controlling the connection (CO) checks the value of the indicator when it performs a decision to insert or remove an entity. Nodes and program units for performing the method are also described.

24 Claims, 8 Drawing Sheets

Legend for Figures

| | |
|---|---|
| CN1 | Core network 1 |
| CN2 | Core network 2 |
| MSC | Mobile services switching center of CN1 |
| MSC' | Mobile services switching center of CN2 |
| BSC | Base station controller |
| TR | Transcoder of CN1 |
| TR" | Transcoder of CN2 |
| MG | Media gateway of CN1 |
| MG' | Media gateway of CN2 |
| CO | Connection |
| CL | Coding list of CN1 |
| CL' | Coding list of CN2 |
| RAN | Radio access node of CN1 |
| RAN' | Radio access node of CN2 |
| AMR | Adaptive Multirate Coding |
| UMTS | Universal Mobile Telecommunications Service |
| G711 | Coding scheme |
| LE | Local exchange |
| ST | Acknowledgement message |
| CT | Establishment message |
| SC' | Acknowledgement message of CN1 |
| SC' | Acknowledgement message of CN2 |
| SUB | Access node |
| TNN | Transit network |
| MC | Code modification message of CN1 |
| MC' | Code modification message of CN2 |
| MCA | Modification acknowledgment message of CN1 |
| MCA' | Modification acknowledgement message of CN2 |
| HO | Handover |
| TF | Flag |

FIG. 13

METHOD AND NODE FOR THE CONTROL OF A CONNECTION IN A COMMUNICATION NETWORK

TECHNICAL FIELD OF THE INVENTION

The present invention relates to the control of a connection in a communication network.

BACKGROUND OF THE INVENTION

Communication networks consist of interconnected nodes and can be subdivided into core networks and access networks, the latter providing access to user equipment, for example a wireless access for mobile user equipment to a radio access network. Core networks interconnect access networks and further networks, e.g. other core networks or the Internet. In the UMTS architecture, an access network can be controlled by an RNC (radio network controller) which is connected to the core network and provides access to the core network, i.e. serves as access node.

For the transmission on a connection, speech is encoded according to a coding scheme, alternatively denoted as codec. A coding scheme can transport speech either in a compressed or in a non-compressed mode. In many networks, different coding schemes can be used and different nodes can have different capabilities for handling the coding schemes. Transcoders perform the transcoding and rate adaptations between different coding schemes. TFO (Tandem Free Operation) is a configuration of two transcoders with compatible coding schemes on the compressed voice sides at both ends of a connection, i.e. on the interface to the user equipment. In this case, the transcoding stages can be bypassed and the compressed voice coding used end to end in the connection.

Out of band coding negotiation allows that speech connections are established end to end with a common coding scheme, i.e. the same speech coding is used in the whole connection between the access networks. The advantage is that maintaining compressed voice saves core network bandwidth and optimizes speech quality because transcoding stages are avoided.

The ITU (International Telecommunication Union) protocol BICC (bearer independent call control) supports out of band signaling procedures which allow a negotiation of the coding scheme between network nodes. In the ITU-T proposal BICC Q.1901 (International Telecommunication Union, June 2000), coding scheme negotiation is performed from the originating control node in a connection to each subsequent node by including a list of allowed coding schemes in the APP (Application Transport Parameter) parameter in the IAM (Initial Address Message) for the set-up of the connection. Each node checks the list and if it does not support a particular coding type it removes it from the list. The adapted list is passed on with the IAM and any non-supported types are removed as long as the BICC signaling is supported. When the final node, either the terminating node or the last node supporting BICC is reached, the coding scheme type with highest priority is selected. This coding scheme and the list (reduced to an active coding scheme list) are returned to the originating node via all intermediate nodes.

If a transcoder selection is performed by a node at a PLMN (Public Land Mobile Network) border then the indication of the selected coding scheme to subsequent nodes in the section of the connection through the PLM network is a compressed voice coding scheme. In the BICC coding scheme negotiation procedures there are no rules defining how many transcoder stages are allowed and whether an access network that supports out of band coding scheme negotiation can insert transcoders to keep TrFO (transcoder free operation) between the access node and the rest of the network. The number of transcoding stages in a connection end to end can seriously affect the speech quality. If TFO is not possible, more than three transcoding stages typically cause substantial speech degradation. The number of stages causing a substantial degradation depends on the coding algorithm and the speech degradation by further entities in the connection.

The coding scheme negotiation procedures may result in transcoders being inserted to enable supplementary services or because the bearer technology in a node or network does not support compressed voice. For example, ATM (Asynchronous Transfer Mode) networks allow the transmission of either compressed or non-compressed speech while STM (Synchronous Transfer Mode) networks require non-compressed speech coding. Furthermore, the negotiation should result in the optimum location of the transcoders which is not always the case. For example, for connections exiting an STM network to ATM, a transcoder should be located at the network edge to save bandwidth in the ATM network by use of a compressed coding scheme.

In many cases, it is necessary to modify the coding scheme in a section of a connection. For example, a connection is often transferred between different access networks due to a handover. Modifications in the core network are disadvantageous, especially if they require increased transmission bandwidth which will sometimes not be available causing a termination of the connection. The transcoder number in a connection can be increased by a modification with corresponding quality degradation. Again, an optimum location of transcoders is often not achieved.

BRIEF SUMMARY OF THE INVENTION

It is an object of the present invention to obviate the above disadvantages and enhance the average quality of connections in a communication network. It is a further object to avoid both a deterioration of a connection due to changes in the coding scheme and to minimize impacts on the connection in the core network.

The proposed method concerns a communication network comprising a plurality of interconnected nodes. In the communication network, a connection is established stepwise between nodes, generally with an establishment message or a group of establishment messages. At least two of the nodes are adapted to insert an entity into the connection which affects the connection quality or remove an entity affecting the connection quality from the connection. The entity can be embodied as hardware or as software executed in a processing system of a node.

An indicator is forwarded between nodes controlling the connection, preferably until a final node controlling the connection is reached or a last node which can handle the indicator. The indicator indicates whether an entity affecting the connection quality is present in the connection or, if the connection is not yet completely established, in the part of the connection already established. The indicator can for example be sent in the establishment message. A node controlling the connection is adapted to insert an entity into the connection or remove an entity from it, optionally by control messages to other nodes. In case that the controlling node decides an insertion or removal of a transcoder, the node adjusts the indicator accordingly before forwarding the adjusted indicator to a further node controlling the connection.

In a decision to insert or remove an entity during the establishment or modifications of the connection, a node controlling the connection can then check the value of the indicator. The decision can be triggered for example by a request modify the connection parameters from a further node or in the node itself, e.g. if a handover is necessary. For example, the result of the decision can be to add a transcoder if the indicator indicates that no transcoders are present in the connection while preferably no transcoders are added if further transcoders are already present. The removal of a transcoder is caused if a node in the connection receives a request to modify the coding scheme in one section of the connection to the coding scheme which is already used in the adjacent section on the other side of said node as a preferable node compares the coding schemes in both adjacent sections and removes unnecessary transcoders.

The proposed method is especially adapted to out of band signaling for connection establishment and modification. It is, however, also applicable for connections with in-band signaling. In the latter case, the connection is preferably established in a first step, the presence of entities affecting the quality and the indicator are determined in a second step and finally modifications of the entities can be performed to achieve the desired value of the indicator.

The proposed method allows to enhance the average quality of connections in a communication network and avoid the deterioration of a connection due to changes in the coding scheme. Impacts on the connection in the core network are minimized because many modifications can be kept local in a single node or in an adjacent pair of nodes. It is possible, to perform temporary modifications, especially when localized within a node, without sending an indicator, for example an insertion of a transcoder pair into the connection for an announcement or tone insertion.

In a preferred embodiment, the indicator is a flag indicating whether any entity is present in the connection. This allows a simple implementation of the method and a small message size.

Alternatively, the indicator can be a counter indicating the number of entities in the connection. The indicator can also be a variable indicating the accumulated speech degradation by the entities in the connection. For the evaluation of the indicator in the decision, a comparison to a threshold value is proposed. This allows to insert a further transcoder even if the connection already comprises one while a higher transcoder number or speech degradation than the threshold is excluded. The control of the connection is improved in this way.

The entity affecting the speech quality can especially be a transcoder or a pair of transcoders. Another example is a conference device for connecting conference calls.

Handling and control of the connection can be performed in the same node, e.g. in a mobile services switching center according to GSM specifications. Alternatively, the communication network can comprise a separate control plane with control nodes and a user plane with payload nodes which are controlled by the control nodes. Then control messages, e.g. establishment messages, comprising the indicator are sent between control nodes and the connection is set up between payload nodes.

The proposed method is especially suitable if the connection is a speech connection.

In a modification of the connection, the insertion or removal of entities is preferably controlled by modification messages between the nodes controlling the connection.

To provide the present value of the indicator to the nodes controlling the connection, the indicator can be included in an establishment message or modification message. Preferably, the result of all changes during the establishment or modification of a connection, i.e. the final value of the indicator, is forwarded to the nodes controlling the connection, especially to the nodes adapted to insert or remove an entity. The indicator can be updated in an acknowledgement message for a modification message or an establishment message, respectively.

To resolve conflicts in the case of crossing modification messages, it is proposed that a defined node controlling the connection has a priority for selecting a modification. For example, either the originating or the final node in any connection can have the priority to discard modifications by other nodes in this case.

A preferable node for the control of a connection in a communication network with a plurality of nodes has an interface to at least one further node for receiving control messages for a connection, e.g. establishment messages, modification messages or acknowledgements. A processing system of the node is adapted to establish at least a section of the connection and insert an entity into the connection which affects the connection quality or remove an entity affecting the connection quality from the connection. If the node is a control node, these processes can be performed by corresponding commands to a payload node.

The processing system of the proposed node checks a received control message for an indicator indicating the presence of an entity affecting the connection quality in the connection and stores the value of the indicator in a memory. The processing system checks the present value of the indicator when it performs a decision to insert or remove an entity. The processing system adjusts the stored value of the indicator according to the decision and forwards the value over the interface to a further node in the connection. The node can be used in any of the above methods.

An advantageous program unit is stored on a data carrier or loadable into a network node and comprises code for receiving a control message for a connection, e.g. an establishment message or a modification message or an acknowledgement message. The program unit checks the received message for an indicator which indicates the presence of an entity affecting the connection quality in the connection. The unit evaluates the indicator in a decision to insert or remove an entity affecting the quality of the connection, adapts the indicator according to the decision and sends it in a message to a further node which controls the connection. The program unit initiates the insertion or removal of the entity according to the decision. Functions of the program unit can be performed by function calls to other program units, e.g. to a processing system. The program unit can perform steps from any of the above methods.

The foregoing and other objects, features and advantages of the present invention will become more apparent in the following detailed description of preferred embodiments as illustrated in the accompanying drawings.

DETAILED DESCRIPTION OF THE INVENTION

Figure 5:
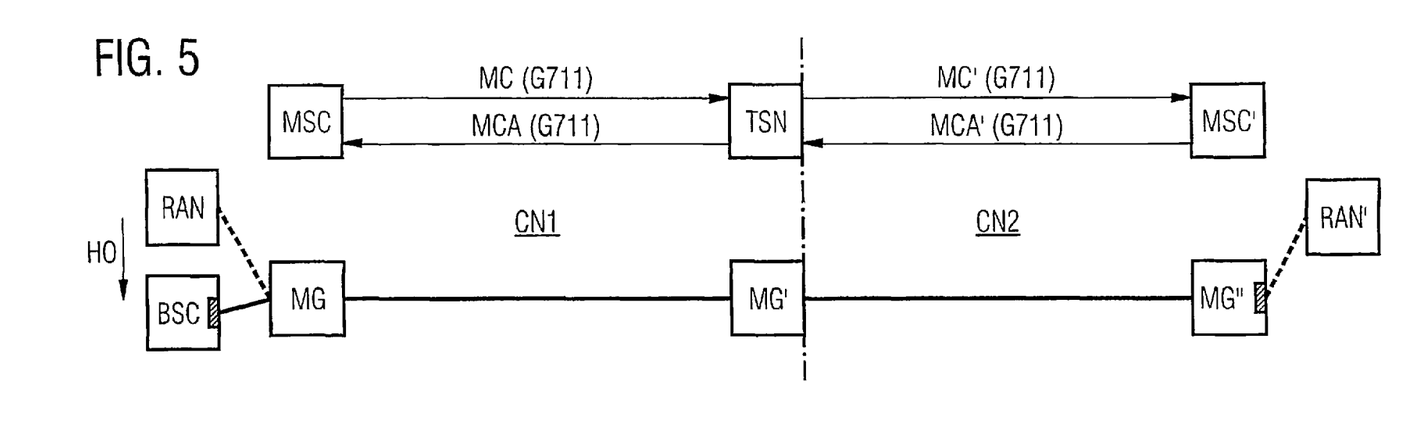
FIG. 5 shows a first alternative for the connection depicted in FIG. 1 after a handover
Figure 6:
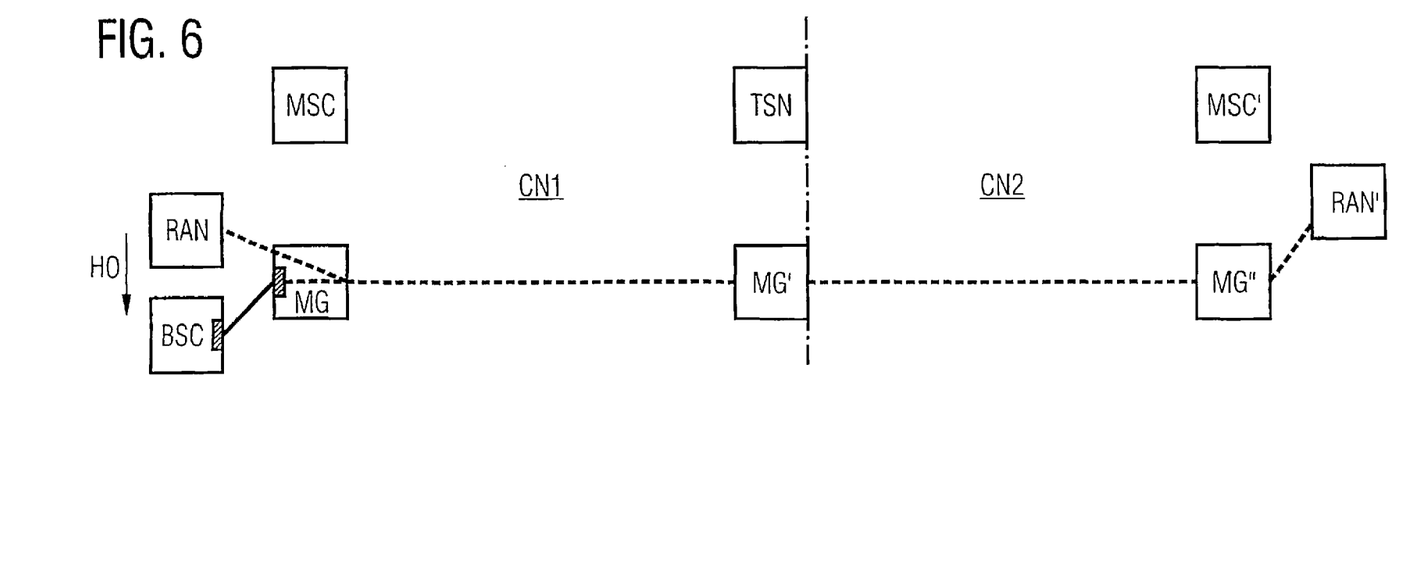
FIG. 6 shows a second alternative for the connection depicted in FIG. 1 after a handover
Figure 7:
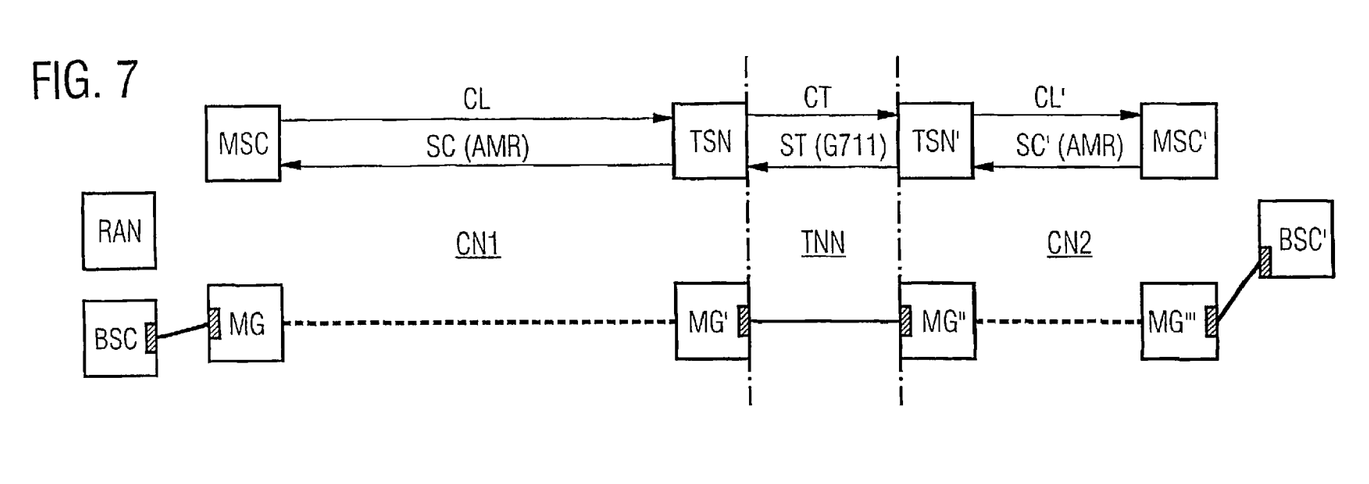
FIG. 7 shows a connection corresponding to FIG. 4 after a handover
Figure 8:
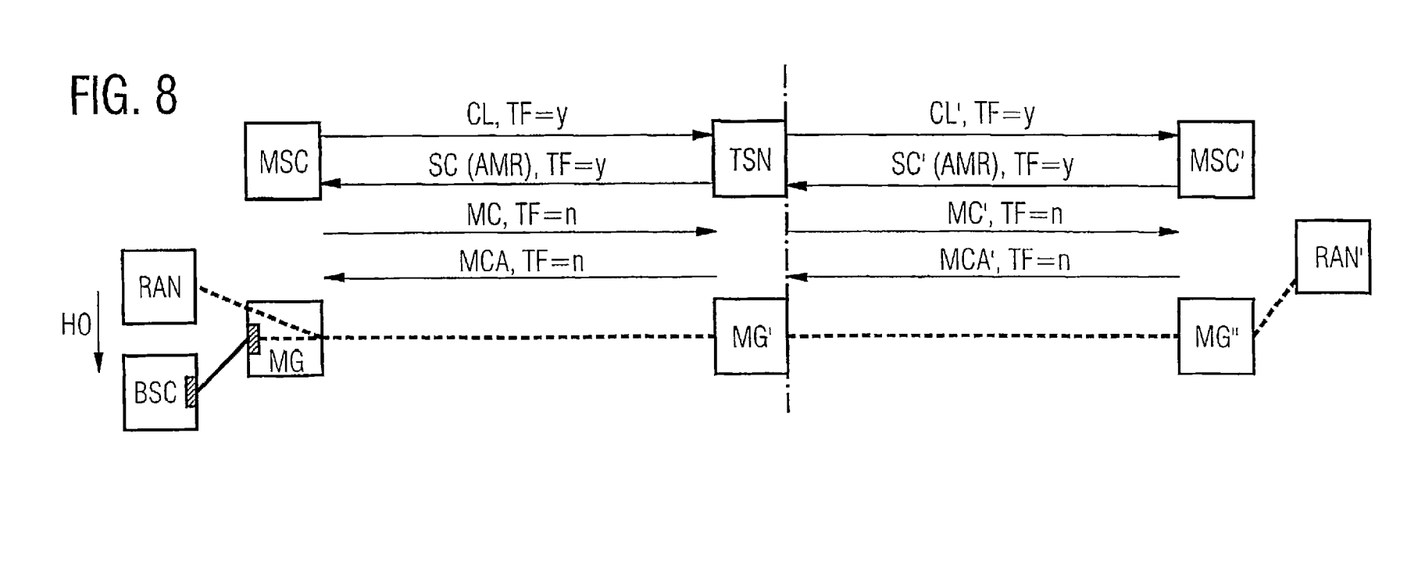
FIG. 8 shows the establishment and modification of a connection according to the invention
Figure 9:
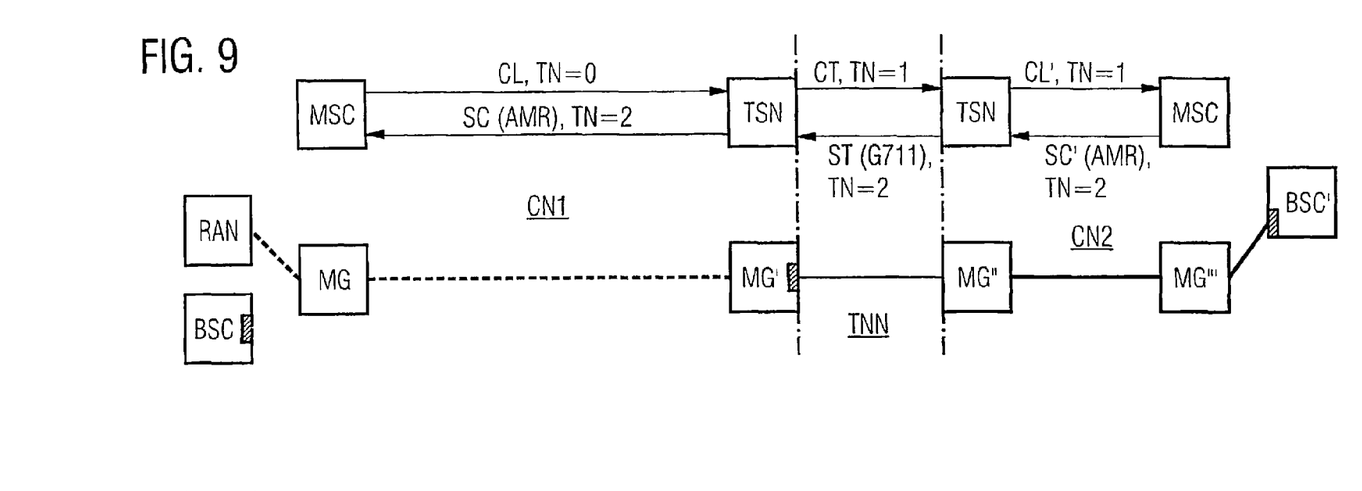
FIG. 9 shows the establishment of a connection according to a further embodiment of the invention
Figure 10:
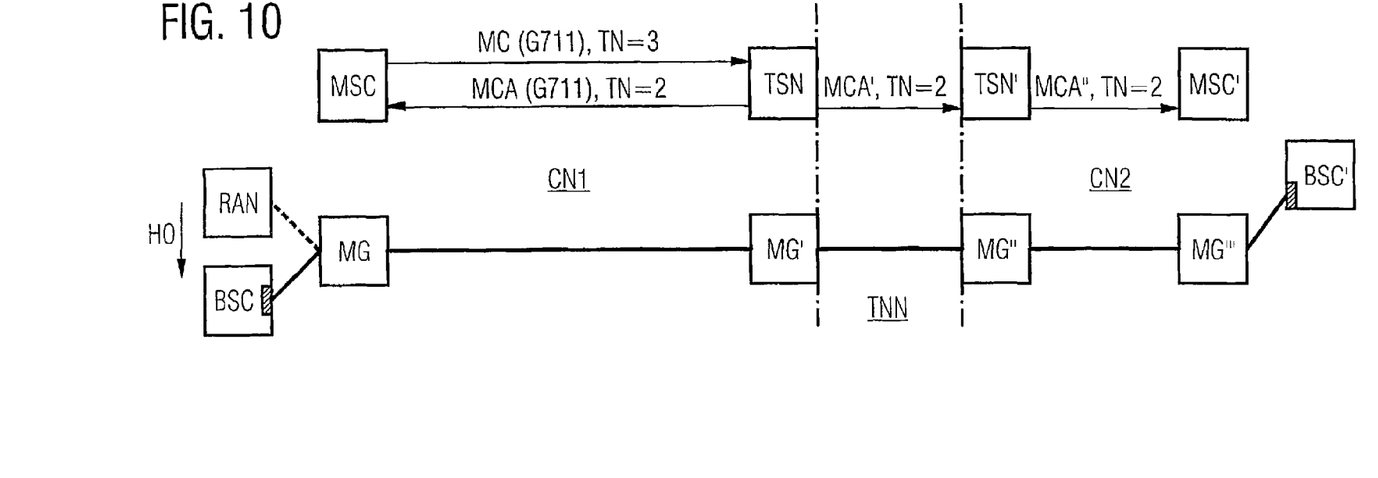
FIG. 10 shows a modification of the connection in FIG. 9 after a handover.
Figure 13:
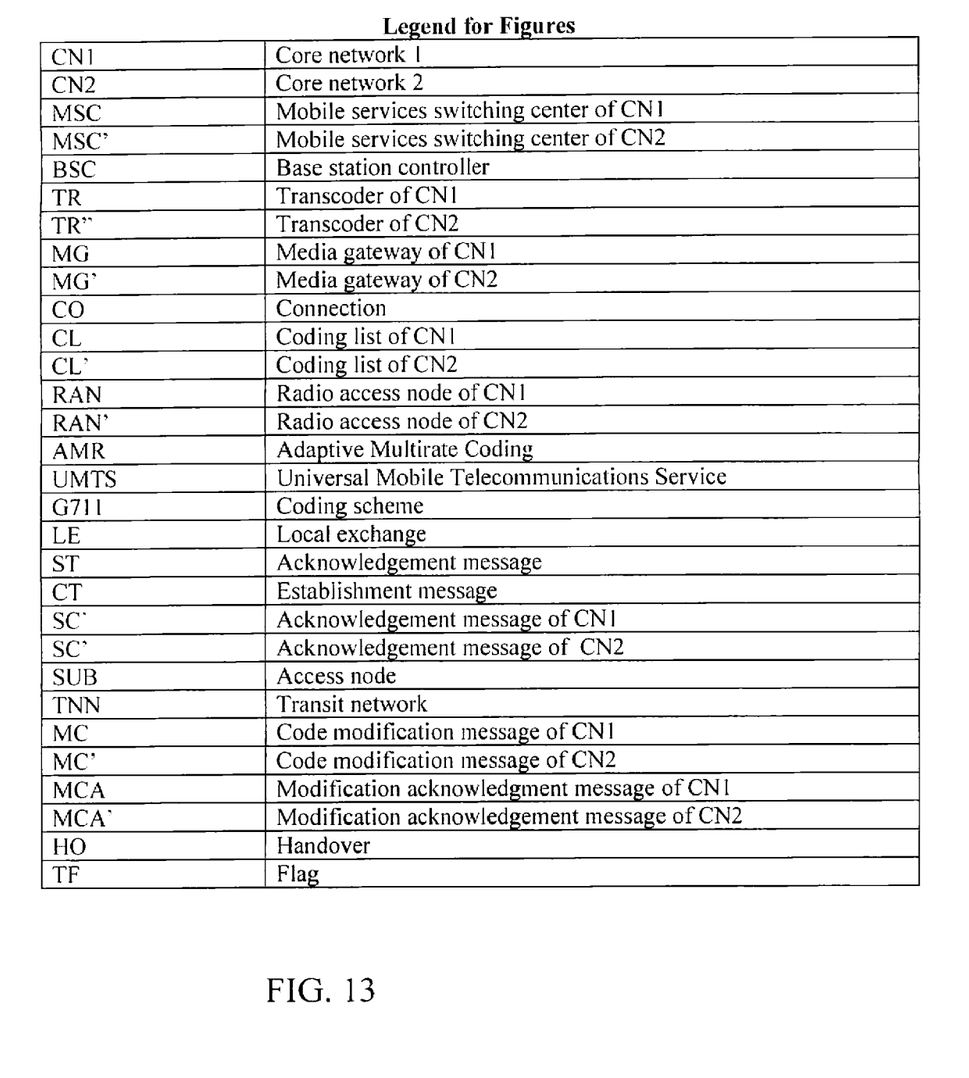
FIG. 13 shows a legend of acronyms for use with FIGS. 1-12.

In the following description, FIGS. 1 to 4 show different examples of connections. FIGS. 5 to 7 depict the influences of modifications on these connections without the proposed method while FIGS. 8 to 10 illustrate the influences of modifications performed using the proposed method. Corresponding reference signs relate to corresponding features in all figures. FIG. 13 provides a legend for use with FIGS. 1-12.

Figure 1:
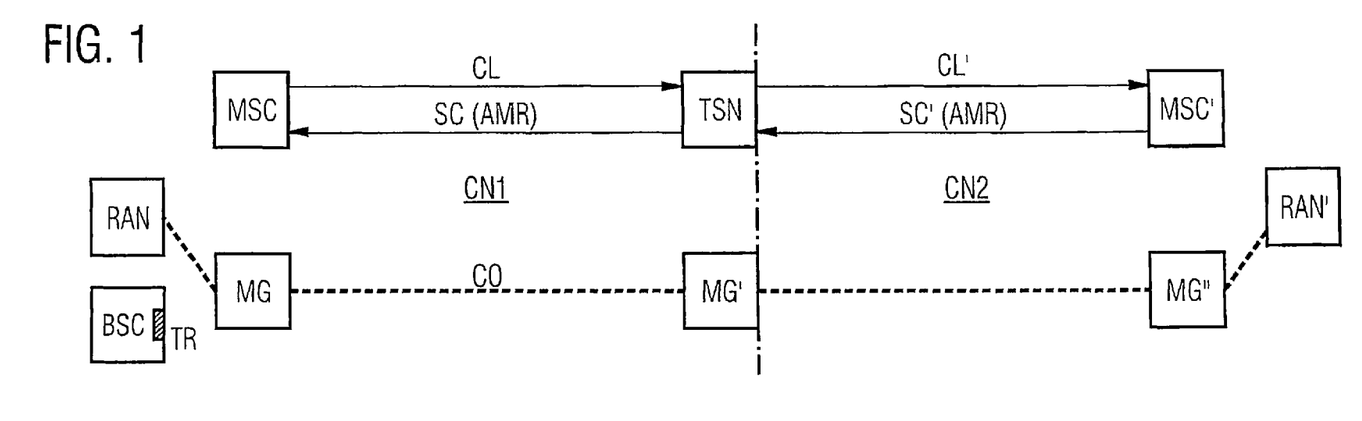
FIG. 1 shows the establishment of a first connection in a communication network

FIG. 1 shows the establishment of a first connection in a communication network. The network comprises a user plane with payload nodes MG, e.g. media gateways, for the handling of the payload. At both ends, access nodes RAN provide connections to UMTS radio access networks which handle the wireless connections to user equipment. A control plane comprises control nodes, e.g. mobile services switching centers MSC and transit nodes TSN, which control the nodes MG handling the payload. It is possible that a control node controls several payload nodes or that a payload node is controlled by several control nodes simultaneously.

The connection establishment is initiated from an originating control node MSC, e.g. according to a call request received from user equipment via access node RAN. The connection is established stepwise using one or several messages sent between the control nodes controlling the nodes handling the payload in the next sections of the connection CO. The messages comprise a list CL of possible coding schemes for the connection which can be selected by the receiving node. A typical coding scheme list comprises for example the schemes AMR (Adaptive Multirate Coding), EFR (Enhanced Full Rate) and PCM which is also denoted G711. The receiving node returns an acknowledgement message SC with the selected coding scheme indicated in brackets. In the example, the AMR coding can be selected for the whole connection because all nodes are compatible with UMTS specifications.

The connection in FIG. 1 is established between two UMTS PLMN networks CN1, CN2 as indicated by a dot-dashed line separating both. The transport mode in the user plane of both networks is for example ATM. When the connection is set up from access node RAN and all nodes select AMR for the connection, this coding scheme can be used end to end between both radio access nodes RAN, RAN' through both core networks CN1, CN2.

For simplicity, as in all figures, connections represented by dashed lines indicate a coding scheme with speech compression while continuous lines indicate a coding scheme without speech compression. Black rectangles represent a transcoder TR in the respective node.

The coding scheme negotiation procedures allow a node to insert a transcoder if it cannot continue the connection establishment using a compressed voice coding scheme from the available list CL. In a second connection depicted in FIG. 2, the originating access node RAN is again part of a UMTS radio access network while the receiving end is a GSM network with a base station controller as access node BSC for the connection to the core network CN2. As in FIG. 1, the AMR coding scheme can be used throughout most of the connection.

Figure 2:
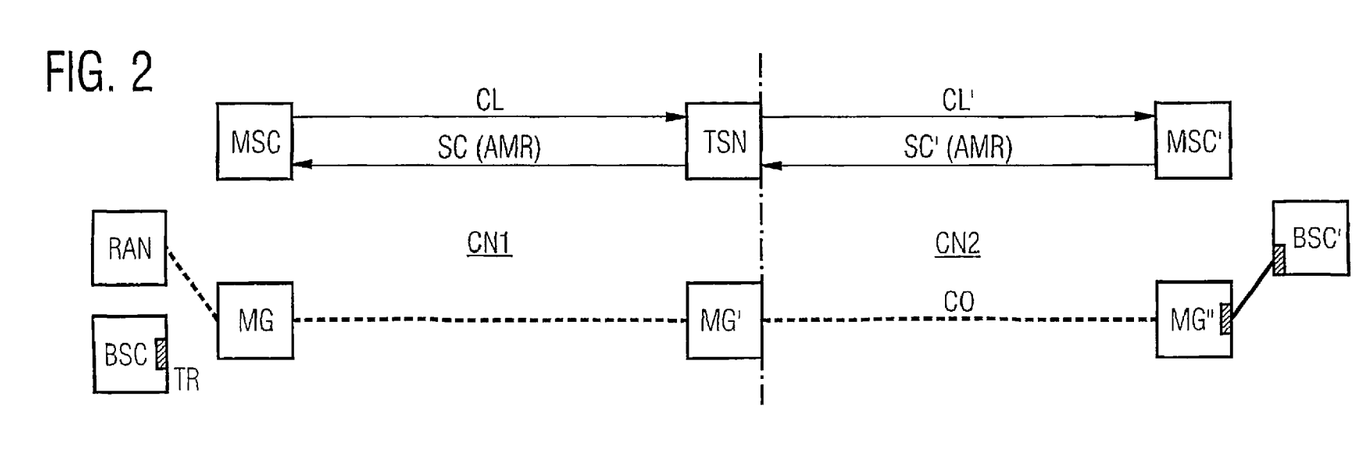
FIG. 2 shows the establishment of a second connection in a communication network

However, at the receiving end it is necessary to include a transcoder to convert the coding scheme to the PCM type required by the base station controller BSC'.

Figure 3:
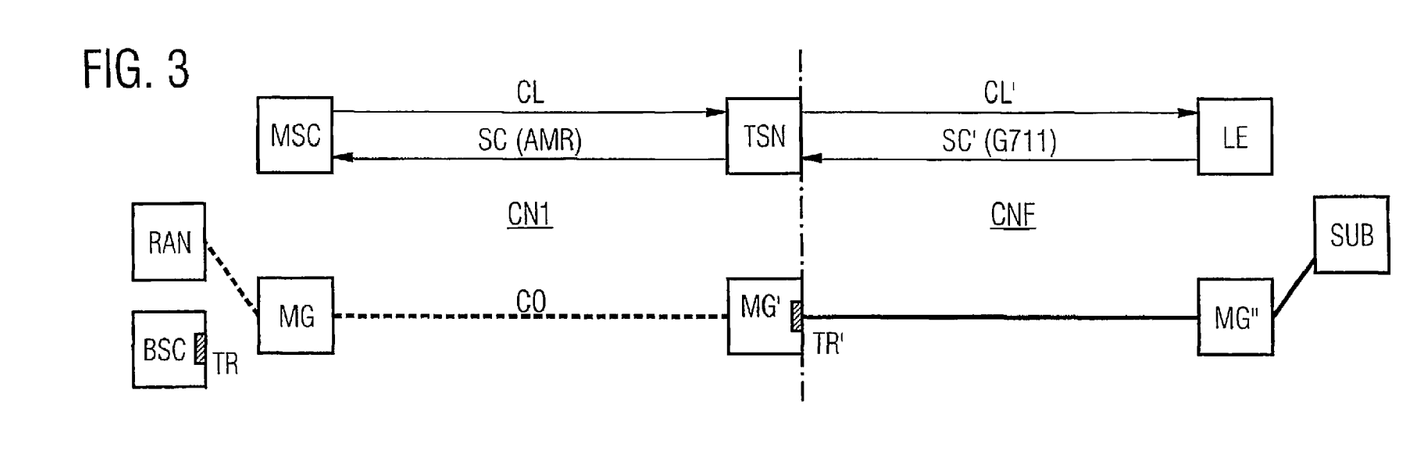
FIG. 3 shows the establishment of a connection with a transcoder on the border between two core networks
Figure 4:
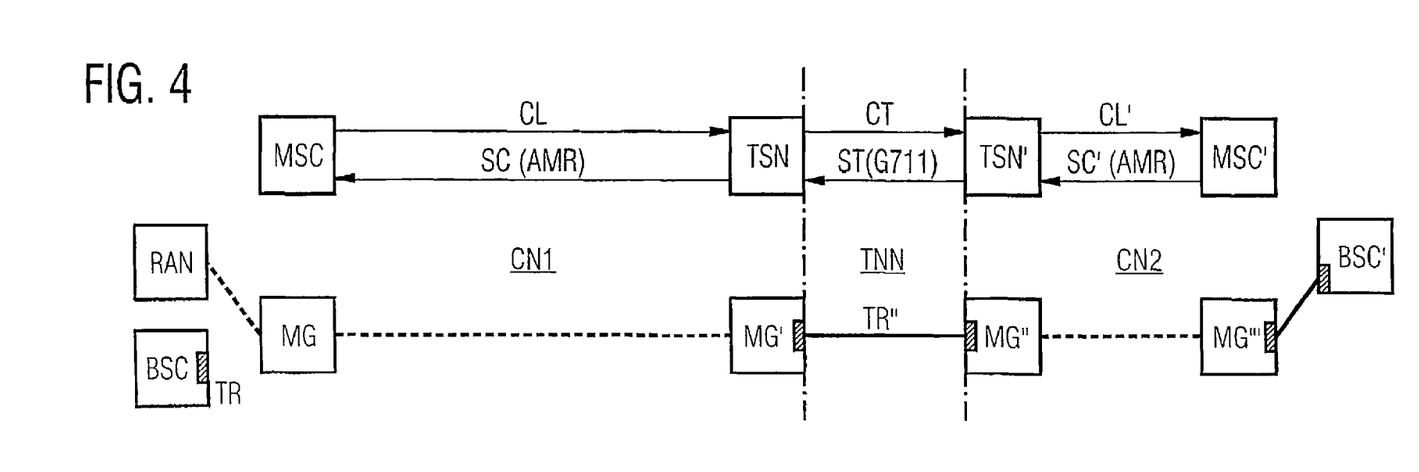
FIG. 4 shows the establishment of a connection with a transit network between two core networks

Different scenarios with a transcoder TR', TR" on the border between two core networks are shown in FIGS. 3 and 4. In FIG. 3, the terminating user is located in a PSTN (Public Switched Telephone Network) CNF with a local exchange LE as control node and connected to an access node SUB. In the PSTN, the selected is coding scheme is G711 while in the PLMN CN1 serving the originating user, the selected coding scheme is AMR. This requires the insertion of a transcoder TR' on the border of both networks. As this is the only transcoder in the connection, the speech quality is sufficient.

In the example of FIG. 4, the originating user is served by a UMTS access network with access node RAN while the terminating user is served by a GSM network with access node BSC. Both networks are interconnected by a transit network TNN which does not support the transmission of compressed voice but forwards an establishment message CT and transfers an acknowledgement message ST. In this case the originating end receives AMR coding scheme while the terminating end of the connection requires G711 coding scheme. A further transcoding is required for the transit network TNN which can be for example an STM network requiring PCM coding. Corresponding transcoders TR" are located at the borders indicated by dot-dashed lines between the core networks CN1, TNN, CN2. The result is that the high number of four transcoding stages results in a strong quality degradation of the connection.

It is often necessary to modify the coding scheme in a section of a connection, e.g. if the connection is transferred between different access networks due to a handover which can be required when a user leaves a coverage area of a network or if a different access network is needed to fulfill changed connection requirements. As can be seen from FIGS. 5 to 7 there are generally two options if a modification is necessary for the encoding in a section of a connection.

1. A coding scheme modification can be performed and signaled, the modification either resulting in a different compressed voice coding scheme (<16 kb/s) or in a PCM (Pulse Code Modulation) non-compressed coding (64 kb/s).
2. Two transcoders can be inserted, one to match the active coding scheme of the section of the connection and the other to match the new coding scheme after modification. PCM encoding runs between the transcoders. If the transcoders are co-located only a very short section of the transmission is performed at 64 kb/s, ideally within a node.

If the first option is performed and no transcoders are in the connection as in the, example of FIG. 1, then the BICC coding scheme modification procedures result in a transcoder inserted at the far end's access node. This is where the coding scheme modification procedures will be terminated because any intermediate node receiving a code modification message MC performs the modification and forwards the message to the subsequent node until a node is reached which can not pass it on. Thus the entire connection through the core networks reverts to PCM with a data rate of 64 kb/s which is confirmed in an acknowledgement message MCA returned to the node which initiated the modification. The modification is often disadvantageous as more bandwidth is needed in the network and modifications are necessary in all nodes. Two transcoders are added to the connection as can be seen from the comparison of FIGS. 1 and 5.

If a re-negotiation of the connection with a new list of coding schemes is allowed in the network, the result can be a coding which was not negotiated at connection establishment, e.g. the modified coding scheme is not contained in the GSM coding scheme list to support TFO. Then there may be a node in the connection that does not support the coding scheme. As a result it would also be necessary to use PCM across the network.

The second of the above options is advantageous if the entire connection was originally transcoder free because only two transcoders are added which are preferably located in the same access network or in an access node and a node adjacent to the access network requiring the modification. No modifications of other sections of the connection and in further nodes of the connection are required. Thus bandwidth is saved and also the complications avoided of inserting transcoders at the far end of the connection. This is obvious from the comparison of FIGS. 5 and 6.

However the second option is not the best solution if the connection was already established with transcoders in other parts of the network like in FIG. 4. This results in six transcoders in the example of FIG. 7 which severely affect the connection quality. In contrast, a coding scheme modification according to the first option would remove one transcoder in the example of FIG. 4. In the example of FIG. 3, the second option would also increase the transcoder number.

A problem with existing connection control messages is that the nodes in a connection do not know if the connection was successfully negotiated end to end with a single coding scheme or if a transcoder is inserted, e.g. when the connection crosses the border between networks. The proposed method provides information to the nodes which perform coding scheme negotiation about the transcoding stages in the connection. The node can then optimize the establishment or modifications in the encoding of the connection both for bandwidth usage and transcoding stages, i.e. the node can select the preferable of the two options above.

The method proposes a new indicator which is, e.g., added to the message in the negotiation of the connection parameters according to BICC. The indicator can be implemented in a number of different ways. Two embodiments are a flag indicating whether a connection is transcoder-free from end to end or a counter containing the number of transcoders in a connection.

It is possible that the connection is modified at two nodes, e.g. in the case of a handover at both ends of a connection or an introduction of a supplementary service and a handover. In this case the indicator is not sufficient to achieve the desired configuration of transcoders. For example, nodes at both ends of a connection may add a pair of transcoders resulting in four transcoders. This can be avoided by a Code Modification message CM sent to all control nodes in the connection comprising the indicator or indicating that the indicator is changed. The control nodes MSC, TSN for the access and payload nodes are in this way always provided with the present state of the flag or counter of transcoders in the connection.

A problem can arise in case of a crossed event when both sides modify the connection and accordingly the indicator almost simultaneously, i.e. the indicator is not updated by the code modification message CM sufficiently fast to represent the present state of the connection. To resolve this problem an acknowledgement MCA is proposed. Preferably, the acknowledgement MCA also comprises the present state of the indicator. One side of the connection, e.g. the originating side has a higher priority to insert transcoders. The side with the higher priority can then reject the change of the side with lower priority and only the lower priority side modifies the encoding.

In the first embodiment the indicator is a flag TF which indicates whether the coding scheme negotiation for the set-up of a connection or a modification was performed end to end or terminated at an intermediate node in the network. This provides the necessary information for the nodes in the connection, e.g. the control node for an access network, to decide if they can add one or two further transcoders in a connection. If this is the case, the access node and the adjacent payload node add a pair of transcoders if the flag is not set while no transcoder or a single transcoder is added if the flag is set. For example, in case of a handover from a UMTS to a to GSM access network, the UMTS AMR can be kept in a PLMN as shown in FIG. 8. This saves bandwidth in the core network and avoids unnecessary modifications of the connection. An advantage of the embodiment of the indicator as flag is that a single bit is sufficient to represent the possible states "y" corresponding to a transcoder free connection end to end and "n" corresponding to a connection comprising transcoders. The implementation is simple.

In the second embodiment, the indicator is a counter representing the number of transcoding stages which is passed between nodes during connection set-up and changes in the transcoding. This allows the application of a threshold for the number of transcoding stages that may be inserted. More generally, the method can also be applied to avoid speech degradation due to other equipment in the connection which affect the speech quality. The maximum number of stages depends on the level by which the connection is affected in every stage. A suitable threshold value is for example three transcoding stages as maximum allowed value. The threshold can also depend on the selected coding scheme in a section, e.g. the threshold may be three stages except when EFR coding is selected for which a maximum of four stages could be allowed. In a third embodiment, is also possible that instead of a counter representing the number of stages, the indicator is a variable which is increased according to the level of degradation caused by the respective stage.

When a connection is established with BICC messages, the APP sent in the forward direction includes the indicator and the indicator is incremented if a node inserts a transcoder unit. The terminating node receives the indicator and determines if it can still add transcoders. If the terminating node inserts a transcoder, it also increments the counter. From the terminating node, the counter is returned to the originating node in the APM (Application Transport Mechanism) along with the selected coding scheme. The value is stored in all nodes controlling the connection. If a modification occurs, for example due to handover, the transcoder counter is updated and sent with the APM for coding scheme modification to all control nodes for the connection.

If a network node starts the coding scheme negotiation for a connection from a network in which the transcoder counter is not supported (e.g. in which BICC is not supported or in which a flag instead of a transcoder counter is used) preferably a default value is set corresponding to an unknown number of transcoding stages.

FIG. 9 depicts the set-up of a connection in a communication network as described with respect to FIG. 4. The originating MSC has received AMR as selected coding scheme in message SC, and thus compressed speech is used across the core network CN1. In this case, the transit network TNN is adapted to forward the indicator, i.e. transcoder counter TN, in a message CT and in the corresponding acknowledgement ST. Therefore, all control nodes in the connection are provided by the acknowledgement messages SC, SC', ST with the information that two transcoders are linked into the connection.

In FIG. 10, a handover HO for this connection is performed from a UMTS access node RAN to a GSM access node BSC. The anchor node MSC for the handover HO has stored the counter indicating that the connection already has two transcoders in it. If two further transcoders are added in the access section of the connection then the threshold for the number of transcoders will be exceeded. Therefore, a single transcoder is added in the access node BSC as required by the handover resulting in a present transcoder number of three in the connection. The decision is then made in the control node MSC to modify the coding scheme to PCM which generally reduces the number of transcoders in a connection to a maximum of two because all nodes in the core networks can handle the PCM coding scheme. The information is passed on to the next control node in the code modify message MC with the present counter value of three. The message to modify to the PCM coding scheme, which is already used in one section of the connection adjacent to payload node MG', also in the other section adjacent to payload node MG' allows the control node TSN to remove the transcoder unit at the network border. The updated transcoder counter TN of two is then returned to the control node MSC in the acknowledgement MCA. Preferably, the updated transcoder counter TN is also forwarded to the further control nodes TSN', MSC' in the connection with messages MCA', MCA".

The same decision can also be performed if the counter is not supported by the transit network and set to a default value by the transit node TSN. Then the anchor MSC performs the same decision based on the fact that an unknown number of transcoders is present in the connection.

Both in the case of FIG. 9 and FIG. 10, the first control node MSC could receive a high transcoder number in the acknowledgement messages SC, MCA, depending on the selections of the other control nodes TSN, TSN', MSC' in the connection and the network architecture. In this case, the first control node MSC can modify the connection with a further code modify message to reduce the transcoder number.

Figure 11:
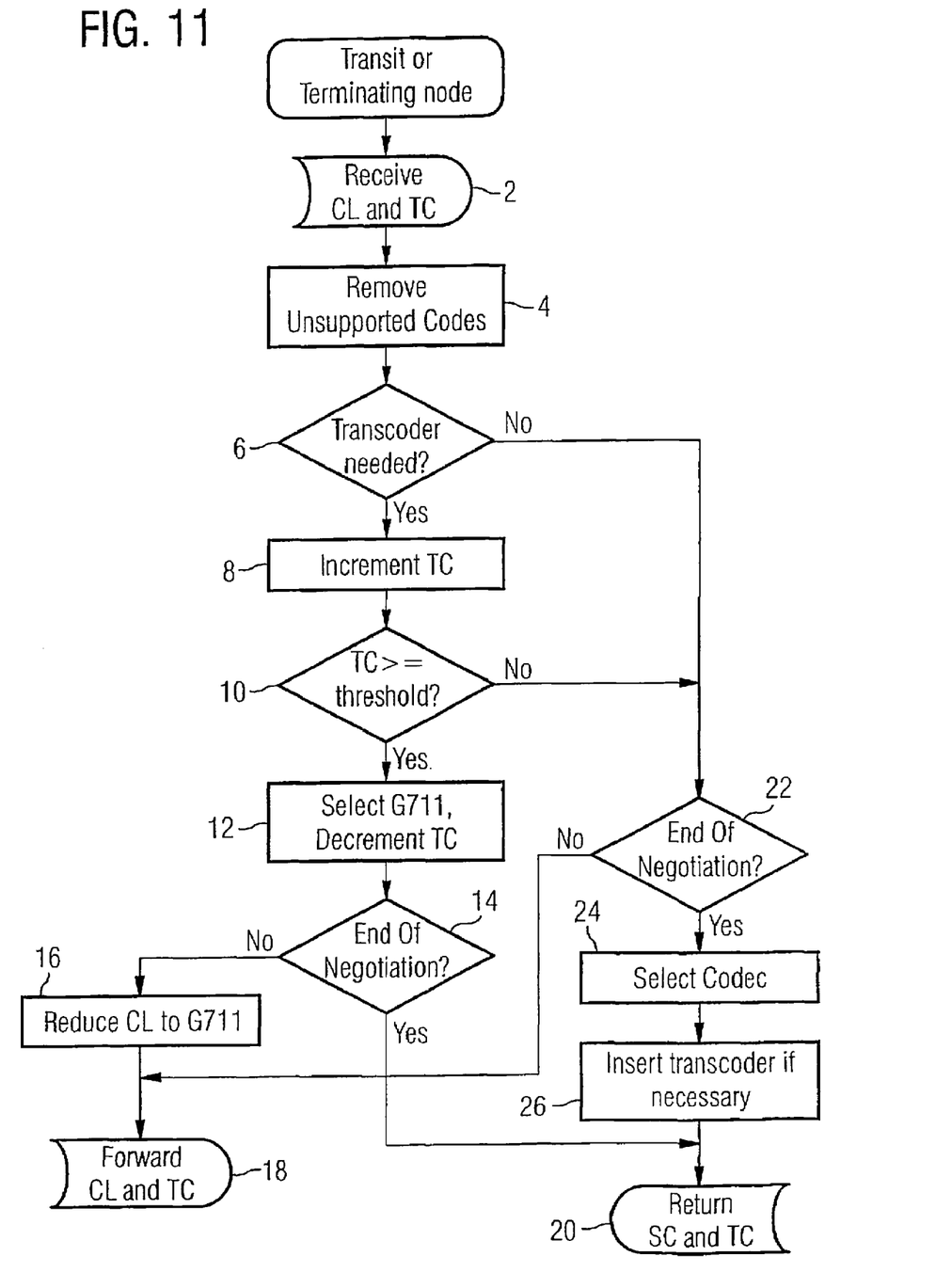
FIG. 11 shows a flow diagram in a control node according to the invention

FIG. 11 depicts an example of a flow diagram for the decision to insert a transcoder in a terminating or transit control node MSC, TSN for a connection, e.g. in a node receiving an establishment message 2. In the message 2, the control node receives a list CL with allowed coding schemes and the counter TC with the transcoder number in the connection. The node checks if all coding schemes in the list CL are supported and removes unsupported schemes in step 4. Then a check 6 is performed whether a transcoder is needed or preferable, e.g. because the node is located at a boundary between core networks or to an access network with different transport protocols.

If the result of check 6 is that a transcoder should be inserted, counter TC is incremented in step 8 and a comparison 10 of the transcoder counter with a predefined threshold for the maximum number of transcoders is performed. If the result of comparison 10 is that the transcoder number is equal to or larger than the threshold, G711 is selected as coding scheme in step 12 and the transcoder counter decremented. Then a further check 14 is performed whether the node is the terminating node controlling the connection or a transit node. In case of a transit node, the list CL of allowed coding schemes is reduced to G711 in step 16. The reduced list CL consisting only of G711 as only allowed coding scheme is forwarded together with the updated transcoder counter TC to the next control node for the connection in a further establishment message 18.

The result of check 14 can also be that the control node is a terminating node, e.g. the last control node before the terminating access network in the connection. Then a transmission of the selected coding scheme, i.e. G711, together with the transcoder number is performed to the originating node of the connection via all previous transit nodes in a message 20.

If no transcoder is needed as determined in check 6 or if the transcoder number is below the threshold as determined in check 10, then also a check 22 is performed whether the node is the terminating node controlling the connection. For a terminating node, a selection 24 of a coding scheme from list CL is performed. An insertion 26 of one or a pair of transcoders is performed if a transcoding is required as determined in check 6. The selected coding scheme from check 22 and the final value of the transcoder counter TC is returned in a message 20 to the originating node via all previous transit nodes.

For a transit node according to check 22, the adjusted list CL of coding schemes and the value of the transcoder counter TC is forwarded to the next control node for the connection in a message 18. Preferably, the insertion of transcoders into the connection is performed according to the selected coding scheme in an acknowledgement message which is received in reply to message 18.

Figure 12:
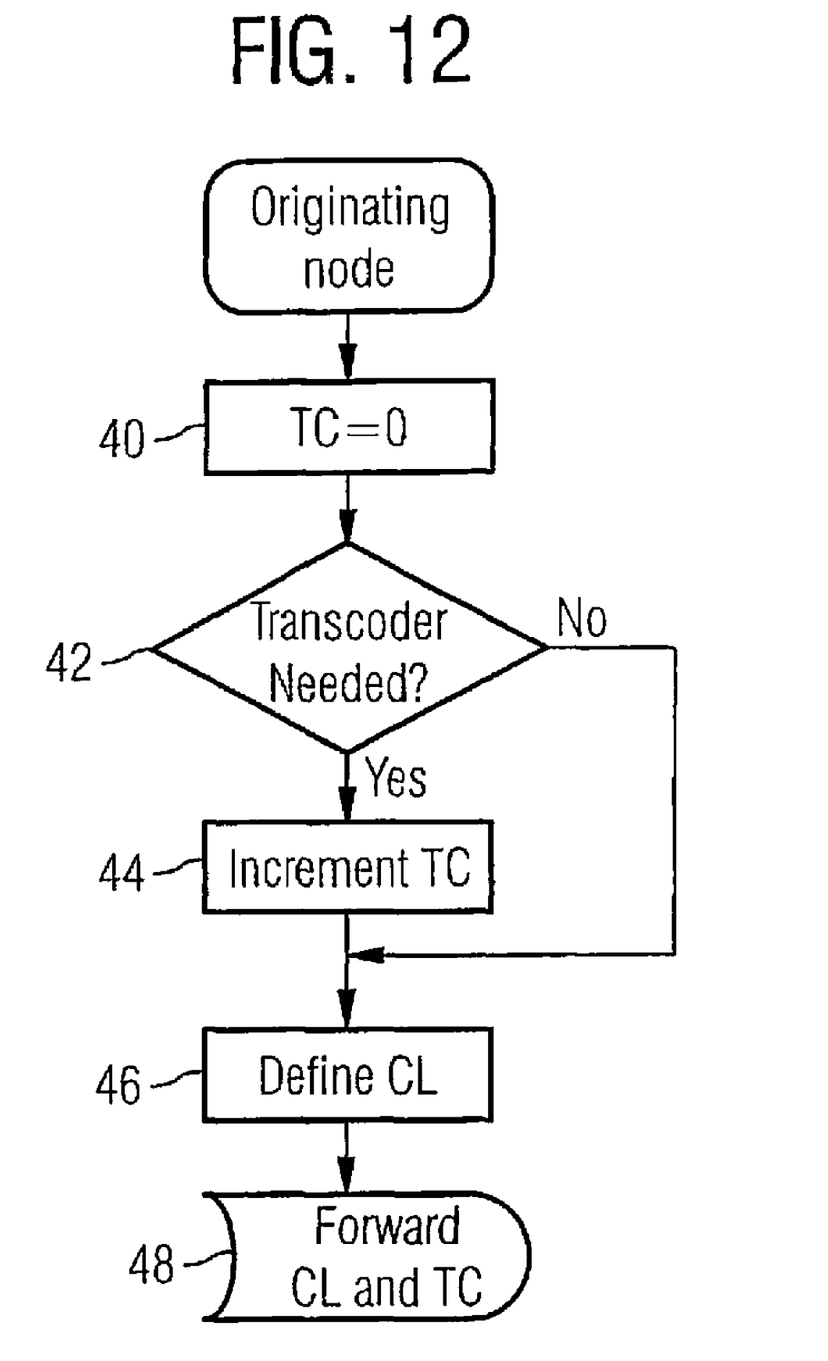
FIG. 12 shows a flow diagram in an originating control node according to the invention

FIG. 12 depicts a corresponding flow diagram for an originating control node in a connection. In a first step 40, the transcoder counter TC is set to zero. Then a decision 42 is performed whether a transcoder is needed or preferable, e.g. because the local insertion of a transcoder avoids the modification of the transcoding in a further section of the connection. If the decision 42 is to insert a transcoder, the counter is incremented in step 44. A list CL of allowed coding schemes is defined in step 46, depending on the capabilities of the originating node. Finally, a message 48 comprising list CL and the value of counter TC is forwarded in a message to the next control node for the connection. Depending on the implementation, the insertion of a transcoder can for example be performed in step 44 or when an acknowledgement in reply to message 48 is received with a selected coding scheme from the list CL.

The proposed method allows nodes to optimize the insertion of transcoders, especially when out of band coding scheme negotiation mechanisms are used. The above embodiments admirably achieve the objects of the invention. However, it will be appreciated that departures can be made by those skilled in the art without departing from the scope of the invention which is limited only by the claims.

The invention claimed is:

1. Method for the control of a connection in a communication network comprising a plurality of nodes, wherein a connection is established stepwise between nodes and at least two of the nodes insert an entity into the connection, the entity affecting the connection quality, or to remove an entity affecting the connection quality from the connection, comprising the steps of:

an indicator is forwarded between nodes controlling the connection wherein the indicator indicates whether the connection comprises an entity affecting the connection quality, a node which decides to insert an entity into the connection or remove an entity adjusts the indicator accordingly before forwarding it to a further node controlling the connection, and a node controlling the connection checks the value of the indicator when it performs a decision to insert or remove an entity.

2. Method according to claim 1, wherein the indicator is a flag indicating whether any entity is present in the connection.

3. Method according to claim 1, wherein the indicator is a counter indicating the number of entities in the connection.

4. Method according to claim 1, wherein the indicator is a variable indicating the accumulated speech degradation by the entity in the connection.

5. Method according to claim 3, wherein the indicator is compared to a threshold value in the decision.

6. Method according to claim 1 wherein an entity is a transcoder or a conference device.

7. Method according to claim 1, wherein the communication network comprises control nodes and payload nodes which are controlled by the control nodes, wherein the indicator is sent between said control nodes and the connection is established between said payload nodes.

8. Method according to claim 1, wherein the connection is a speech connection.

9. Method according claim 1, wherein an entity is inserted or removed according to a modification message.

10. Method according to claim 1, wherein the indicator is sent with an establishment message for the connection.

11. Method according to claim 1, wherein a final value of the indicator after the establishment or modification of the connection is forwarded to nodes in the connection which insert or remove an entity.

12. Method according to claim 1, wherein a defined node controlling the connection has a priority for selecting a modification.

13. A method for controlling a connection within a communication network including a plurality of nodes wherein said connection is established between two or more said plurality of nodes and wherein at least two of said nodes insert or remove an entity into said connection, said entity effecting the quality of said connection, comprising the steps of;

receiving a control message for establishing a connection;

checking an indicator within said control message wherein said indicator indicates whether an entity affecting the connection quality is present in said connection;

determining whether to insert or remove an entity from said connection based on said indicator;

modifying said indicator according to said step of determining;

transmitting said modified indicator in a control message to a further node in said connection; and initiating the insertion or removal of said entity in accordance with said step of determining.

14. The method of claim 13 wherein said indicator is a flag indicating whether any entity is present in said connection.

15. The method of claim 13 wherein said indicator is a variable indicating the accumulated speech degradation by the entity in said connection.

16. The method of claim 13 wherein said indicator is a counter indicating the number of entities present in said connection.

17. The method of claim 16 wherein said step of determining further comprises the step of comparing said indicator to a threshold value.

18. The method of claim 13 wherein said entity is a transcoder.

19. A system for controlling a connection within a communication network including a plurality of nodes wherein said connection is established between two or more said plurality of nodes and wherein at least two of said nodes insert or remove an entity into said connection, said entity effecting the quality of said connection, comprising;

means for receiving a control message for establishing a connection wherein said control message includes an indicator;

means for checking said indicator wherein said indicator indicates whether an entity affecting the connection quality is present in said connection;

means for determining whether to insert or remove an entity from said connection based on said indicator;

means for modifying said indicator according to said determination;

means for transmitting said modified indicator in a control message to a further node in said connection; and means for initiating the insertion or removal of said entity in accordance with said determination.

20. The system of claim 19 wherein said indicator is a flag indicating whether any entity is present in said connection.

21. The system of claim 19 wherein said indicator is a variable indicating the accumulated speech degradation by the entity in said connection.

22. The system of claim 19 wherein said indicator is a counter indicating the number of entities present in said connection.

23. The system of claim 22 further storing a threshold value and said means for determining compares said indicator to said threshold value for making that determination.

24. The system of claim 19 wherein said entity is a transcoder.

* * * * *